(12) United States Patent
Halfmann et al.

(10) Patent No.: US 12,184,064 B2
(45) Date of Patent: Dec. 31, 2024

(54) ARRANGEMENT AND METHOD FOR CONNECTING AND/OR DISCONNECTING A PLURALITY OF DC SUB-NETWORKS

(71) Applicant: Siemens Energy Global GmbH & Co. KG, Munich (DE)

(72) Inventors: Ulrich Halfmann, Langensendelbach (DE); John-William Strauss, Erlangen (DE); Udo Rathje, Schwarzach (DE); Frank Schettler, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 19 days.

(21) Appl. No.: 18/332,115

(22) Filed: Jun. 9, 2023

(65) Prior Publication Data

US 2024/0006881 A1    Jan. 4, 2024

(30) Foreign Application Priority Data

Jul. 1, 2022 (EP) ..................................... 22182530

(51) Int. Cl.
*H02J 3/36* (2006.01)
*H02J 1/10* (2006.01)
*H02J 1/12* (2006.01)

(52) U.S. Cl.
CPC ................ *H02J 1/109* (2020.01); *H02J 1/12* (2013.01)

(58) Field of Classification Search
CPC ..................................... H02J 1/109; H02J 1/12
See application file for complete search history.

(56) References Cited

U.S. PATENT DOCUMENTS

| 10,992,149 | B1 * | 4/2021 | Kahn | H01M 10/482 |
| 11,837,867 | B2 * | 12/2023 | Sonnathi | H02J 3/001 |
| 2018/0366942 | A1 * | 12/2018 | Gupta | H02H 7/1216 |

(Continued)

OTHER PUBLICATIONS

Xiao Huangqing et al: "Components Sharing Based Integrated HVDC Circuit Breaker for Meshed HVDC Grids", IEEE Transactions on Power Delivery, IEEE Service Center, New York, NY, US, vol. 35, No. 4, Nov. 25, 2019 (Nov. 25, 2019), pp. 1856-1866, XP011800715, ISSN: 0885-8977, DOI: 10.1109/TPWRD.2019. 2955726; [retrieved on Jul. 23, 2020]; 2020.

(Continued)

*Primary Examiner* — Jared Fureman
*Assistant Examiner* — Esayas G Yeshaw
(74) *Attorney, Agent, or Firm* — Laurence A. Greenberg; Werner H. Stemer; Ralph E. Locher (57) ABSTRACT

An arrangement for connecting and disconnecting DC networks includes a main bus for connecting a plurality of DC lines with each other. First and second DC lines are connected between first and second DC networks and the main bus via respective main switches. The DC networks contain a DC operating equipment, such as a converter, an energy storage device, a DC chopper, a DC cable, an energy source and/or a load. A transfer bus that is electrically connected to the main bus has a transfer bus disconnector for disconnecting the main bus from the transfer bus, a transfer switch, and a current limiting device with a resistor and a parallel resistor bypass switch. The first DC line is connected to the transfer bus via a first transfer disconnector and the second DC line is connected to the transfer bus via a second transfer disconnector.

18 Claims, 4 Drawing Sheets

(56) References Cited

U.S. PATENT DOCUMENTS

2021/0408787 A1* 12/2021 Hauer ................. H02J 7/00304
2022/0115879 A1* 4/2022 Kahn ................... H02J 7/0036

OTHER PUBLICATIONS

Ritter Andreas et al: "Prediction of Bus-Transfer Switching in Future HVdc Substations", IEEE Transactions on Power Delivery, IEEE Service Center, New York, NY, US, vol. 33, No. 3, Jun. 1, 2018 (Jun. 1, 2018), pp. 1388-1397, XP011680396, ISSN: 0885-8977, DOI: 10.1109/TPWRD.2017.2764386 [retrieved on Apr. 6, 2018]; 2018.

* cited by examiner

ARRANGEMENT AND METHOD FOR CONNECTING AND/OR DISCONNECTING A PLURALITY OF DC SUB-NETWORKS

CROSS-REFERENCE TO RELATED APPLICATION

This application claims the priority, under 35 U.S.C. § 119, of European Patent Application EP22182530.0, filed Jul. 1, 2022; the prior application is herewith incorporated by reference in its entirety.

FIELD AND BACKGROUND OF THE INVENTION

The present invention relates to an arrangement for connecting and/or disconnecting a plurality of DC networks to each other.

Generally, a DC network (DC grid) comprises one or several connected DC lines. In addition DC networks usually comprise DC operating equipment, such as converters (AC/DC and/or DC/DC), energy storage devices, DC choppers, DC cables, DC overhead lines (or cables), DC circuit breakers, energy sources (e.g., PV plants) and suitable loads. The present invention particularly relates to HVDC networks, i.e., networks with a nominal voltage of more than 100 kV.

In contrast to previously known and frequently implemented point-to-point HVDC connections, HVDC multi-terminal or meshed systems generally have the task of connecting more than one DC line(s) and more than one AC/DC converter (in most applications more than two converters), and other operating equipment.

Under certain operational circumstances several DC networks (DC sub-networks) must be connected to each other or disconnected from each other. Such connecting or disconnecting action may be required while some of the DC lines and the corresponding equipment (especially the converters) are in operation and consequently the DC voltage in the corresponding networks is non-zero.

According to known DC network concepts HVDC breakers can be provided in the network. Such HVDC breakers can be used to break fault currents, clear faults in the DC network and also for connecting and disconnecting actions. However, HVDC breakers are technically challenging and expensive.

SUMMARY OF THE INVENTION

The object of the present invention is therefore to address the above-described problems in the context of connecting and disconnecting DC networks.

With the above and other objects in view there is provided, in accordance with the invention, an arrangement for selectively connecting and disconnecting a plurality of DC networks to one another, the arrangement comprising:
  a main bus for connecting a plurality of DC lines with each other;
  a first DC line for connection to a first DC network having DC operating equipment, and a first main switch connecting said first DC line to said main bus;
  a second DC line for connection to a second DC network having DC operating equipment, and a second main switch connecting said second DC line to said main bus;
  a transfer bus electrically connected to said main bus, said transfer bus including:
    a transfer bus disconnector for disconnecting said main bus from said transfer bus;
    a transfer switch;
    a current limiting device having a resistor and a parallel resistor bypass switch for bypassing said resistor;
    a first transfer disconnector connected between said first DC line and said transfer bus; and
    a second transfer disconnector connected between said second DC line and said transfer bus.

In other words, according to the invention, the arrangement for connecting and/or disconnecting a plurality of DC networks to each other comprises a main bus for connecting a plurality of DC lines with each other, a first DC line to be connected to a first DC network, said first DC line being connected to said main bus via a first main switch, a second DC line to be connected to a second DC network, said second DC line being connected to said main bus via a second main switch, wherein said first and second DC networks each comprise a DC operating equipment, such as a converter, an energy storage device, a DC chopper, a DC cable, a DC overhead line, an energy source and/or a load, a transfer bus electrically connected to said main bus, wherein said transfer bus comprises a transfer bus disconnector for disconnecting the main bus from the transfer bus, a transfer switch, a current limiting device having a resistor and a parallel resistor bypass switch to bypass said resistor, wherein said first DC line is connected to said transfer bus via a first transfer disconnector and said second DC line is connected to said transfer bus via a second transfer disconnector. Disconnectors in the meaning of the present invention are devices capable of disconnecting an electrical line (particularly a high-voltage line) carrying a current (particularly a direct current) of less than 100 A. In the context of the present invention the meaning of the term 'DC network' is very broad and covers also parts of networks ('sub-networks') and or DC grid installations within a DC grid. The first main switch preferably is a disconnector (first main disconnector) and/or the second main switch preferably is a disconnector (second main disconnector). Analogously, any further main switch can also be a disconnector.

An advantage of the arrangement according to the present invention is its ability to limit inrush currents when an item of operating equipment is being connected to the DC grid or two DC sub-networks are being connected to each other. In addition, it can provide a controlled discharging of operating equipment, like DC cables. Also, it can provide a fast and reliable connection or disconnection of DC networks using cost-effective disconnectors instead of full DC circuit breakers. Another important advantage of the present invention is the capability of connecting or disconnecting DC networks independent of the state of the networks (e.g. residual currents present in the corresponding DC lines) and the respective operating equipment, especially without blocking any of the converters in the respective network.

The present invention significantly reduces the number of required high-voltage components without limiting the flexibility of the operating concept. The reduction of the number of components results in a significant reduction in space requirements, overall investment costs and decreased operating costs, since the maintenance requirements relate to a smaller number of components.

Preferably, the current limiting device further comprises an inductance for limiting transient compensating currents occurring during operation of the arrangement. In some embodiments an inductance bypass switch in parallel to the inductance is provided to bypass said inductance.

According to an embodiment, the arrangement further comprises a discharge switch connected between the transfer bus and ground potential. The discharge switch allows a discharging of components and provides a path to ground. By discharging and grounding, the arrangement can be reset to its ground/basic state.

The transfer bus may further comprise a current sensing device and/or a voltage sensing device. The current and/or voltage measurements can be used for a suitable control of the current and/or voltage in the DC node, particularly at a DC side of a converter.

The transfer switch is preferably a mechanical high-speed switch. In particular, the high-speed switch can be for example a well-established mechanical AC switch suitable for switching low currents in the range of 50-100 A. Using a switch of a well-known technology increases the reliability and decreases the costs of the arrangement.

Instead of using passive, air-based cooling, said resistor can be an actively cooled resistor, preferably being cooled by means of a cooling fluid. An active, fluid-based cooling particularly further reduces the space requirements of the arrangement.

The transfer bus can further comprise a converter for an active damping of voltage fluctuations. The converter can be used to replace other damping equipment such as resistors or choking coils.

In accordance with another aspect of the invention, the method for connecting a first DC network to a second DC network (in this context also denoted as DC sub-networks) by means of an arrangement as described above, wherein the first main switch is closed (in operation, resp. conducting), comprises the steps of closing the second transfer disconnector, closing the transfer bus disconnector, closing the transfer switch, closing the resistor bypass switch, closing the second main switch, opening the transfer switch, opening the second transfer disconnector, opening the resistor bypass switch, and opening the transfer bus disconnector.

In accordance with yet another aspect of the invention, the method of disconnecting a first DC sub-network from a second DC sub-network by means of an arrangement as described above, wherein the first main switch and the second main switch are both closed (in operation), comprises the steps of closing the second transfer disconnector, closing the transfer bus disconnector, closing the transfer switch, closing the resistor bypass switch, commutating the current to the transfer bus by opening the second main switch, opening the resistor bypass switch, opening the transfer switch, and opening the transfer bus disconnector and the second transfer disconnector.

The method steps of the above-described methods for connecting and disconnecting DC sub-networks preferably are performed in the order as listed above.

For the connecting and the disconnecting of sub-networks it might be of advantage if the first DC sub-network comprises at least one actively controllable operating equipment, preferably a converter, and a first DC line current is controlled to a level below 100 A, most preferably to zero. The first DC line current can be for example a current in the main or the transfer bus or a DC current at the DC side of the controllable operating equipment.

Other features which are considered as characteristic for the invention are set forth in the appended claims.

Although the invention is illustrated and described herein as embodied in an arrangement and a method for selectively connecting and disconnecting a plurality of dc sub-networks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Identical or functionally similar elements and components are identified with the same reference numerals throughout the figures.

DETAILED DESCRIPTION OF THE INVENTION

Figure 1:
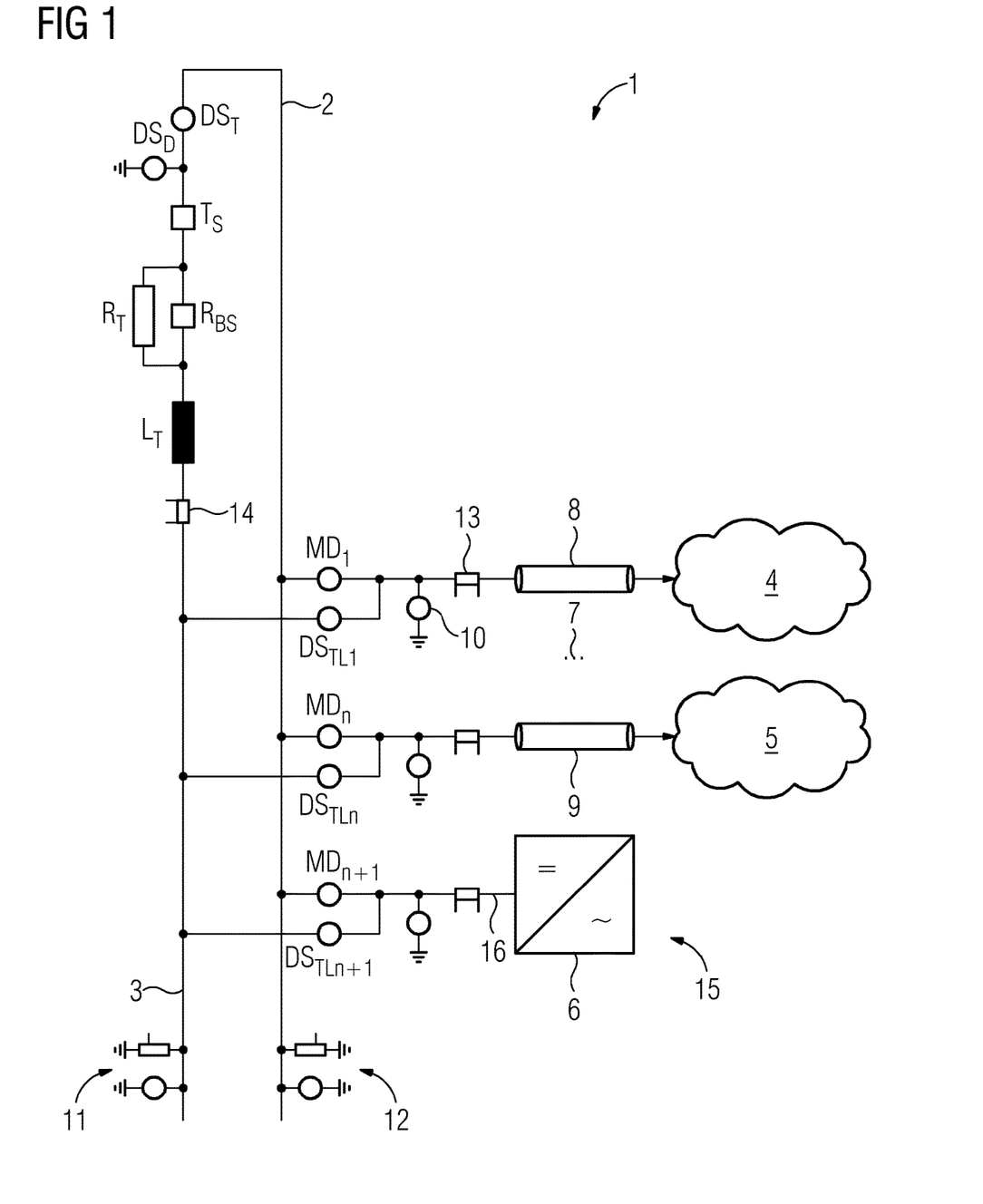
FIG. 1 is a schematic view of a first embodiment of the arrangement according to the invention.

Referring now to the figures of the drawing in detail and first, in particular, to FIG. 1 thereof, there is shown an arrangement 1 for connecting or disconnecting a plurality of DC networks to each other. In the example of FIG. 1 the plurality of DC networks comprises a first DC network 4, a second DC network 5 and a third DC network 15. Any number of additional DC networks can also be connected in this way as it is indicated by the dotted line 7 in FIG. 1.

Each of the first DC network 4 and the second DC network 5 comprise several DC lines and DC operating equipment, such as a converter, an energy storage device, a DC chopper, a DC cable, a DC overhead line, an energy source and/or a load. These are indicated in FIG. 1 by a cloud symbol. Since the invention is basically independent of the operating equipment present in the networks, it is not described here in more detail. The third DC network 15 comprises an AC/DC converter 6 which on its AC side is connected to an AC network (i.e., a non-illustrated AC grid). It is worthwhile mentioning that the figure shows the installation for one of the DC poles. Similar arrangements are suitably provided for each of the DC poles (positive, negative and/or neutral).

The arrangement 1 comprises a main bus 2 for connecting a plurality of DC lines, namely a first DC line 8, a second DC line 9 and a third DC line 16, with each other. The first DC line 8 connects the main bus 2 with the first DC network 4 via a first main switch $MD_1$. The second DC line 9 connects the main bus 2 with the second DC network 5 via a second main switch $MD_n$. The third DC line 16 connects the main bus 2 with the converter 6 via a third main switch $MD_{n+1}$. The first DC line 8 further comprises grounding equipment 10 and a current measurement facility 13. The other DC lines 9, 16 are equipped accordingly. The main bus 2 also comprises a voltage sensing device 12.

The arrangement 1 further comprises a transfer bus 3 that is electrically connected to the main bus 2. The transfer bus 3 comprises a transfer bus disconnector $DS_T$ for electrically disconnecting the main bus 2 from the transfer bus 3, a transfer switch $T_S$ which is a fast mechanical switch and a current limiting device having a resistor $R_T$ and a parallel resistor bypass switch $R_{BS}$ to bypass said resistor $R_T$. The transfer bus 3 further comprises a discharge switch $DS_D$ connected between the transfer bus 3 and ground potential, an inductance $L_T$, a current sensing device 14 and a voltage sensing device 11. The first DC line 8 is connected to the transfer bus 3 via a first transfer disconnector $DS_{TL1}$, the second DC line 9 is connected to the transfer bus 3 via a second transfer disconnector $DS_{TLn}$ and the third DC line 16 is connected to the transfer bus 3 via a further transfer bus disconnector $DS_{TLn+1}$.

Figure 2:
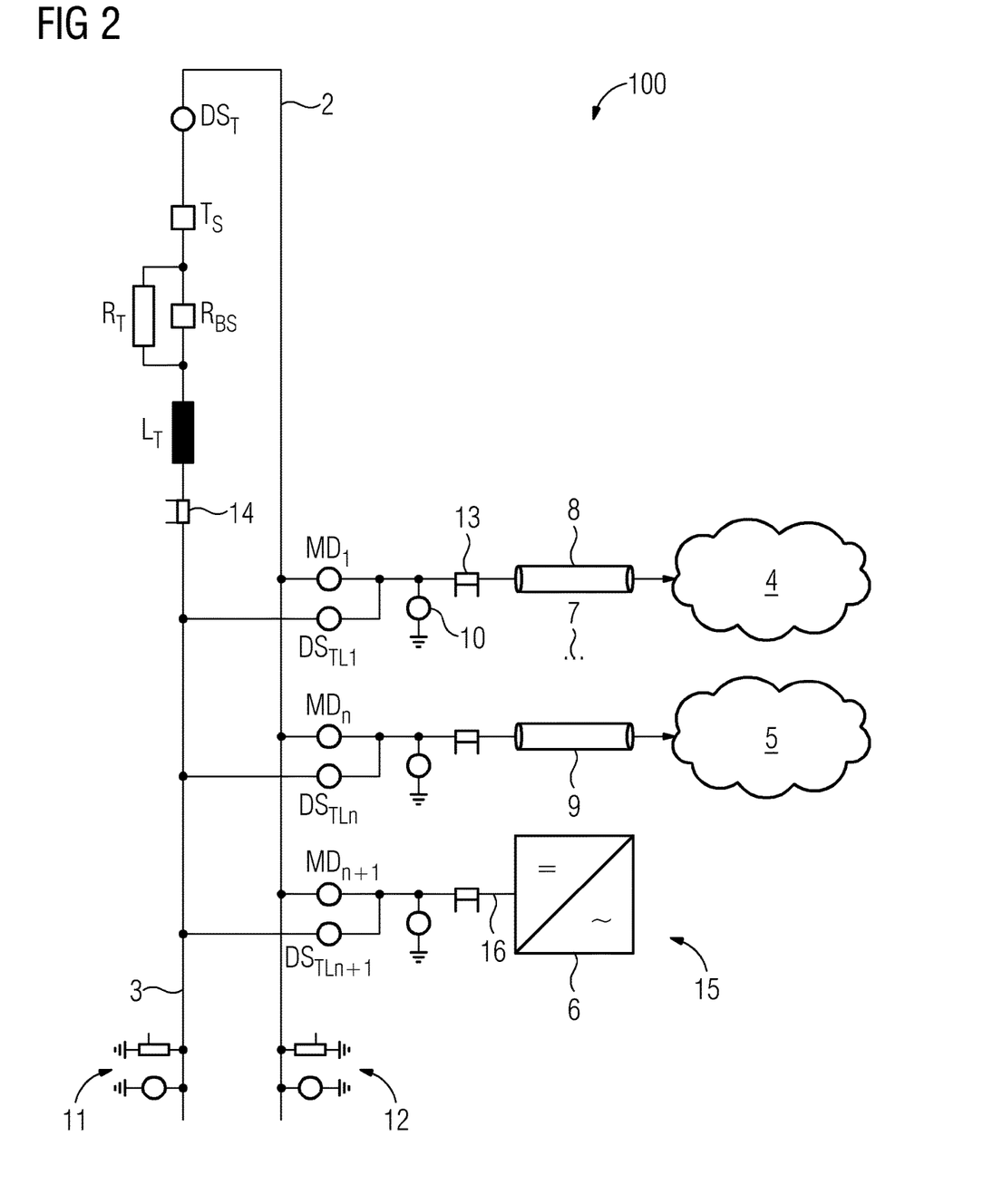
FIGS. 2-4 are schematic views of different variants of the arrangement according to the invention.

FIG. 2 shows an arrangement 100 for connecting or disconnecting a plurality of DC networks to each other (three DC networks, namely a first DC network 4, a second DC network 5 and are third DC network 15 are explicitly shown in FIG. 2).

Functionally identical and similar elements in the arrangements 1 and 100 are identified with the same reference numerals. Same applies to the arrangements 101 and 102

Generally, the arrangements 1 and 100 are functionally similar. To avoid repetitions, only the differences between the embodiments will be described in detail. Same applies also to the embodiments shown in the following FIGS. 3 and 4.

In contrast with the arrangement 1 of FIG. 1, the transfer bus 3 of the arrangement 100 does not have a discharge switch. The discharging is instead achieved via other discharging equipment that is provided, for example, within the DC networks.

Figure 3:
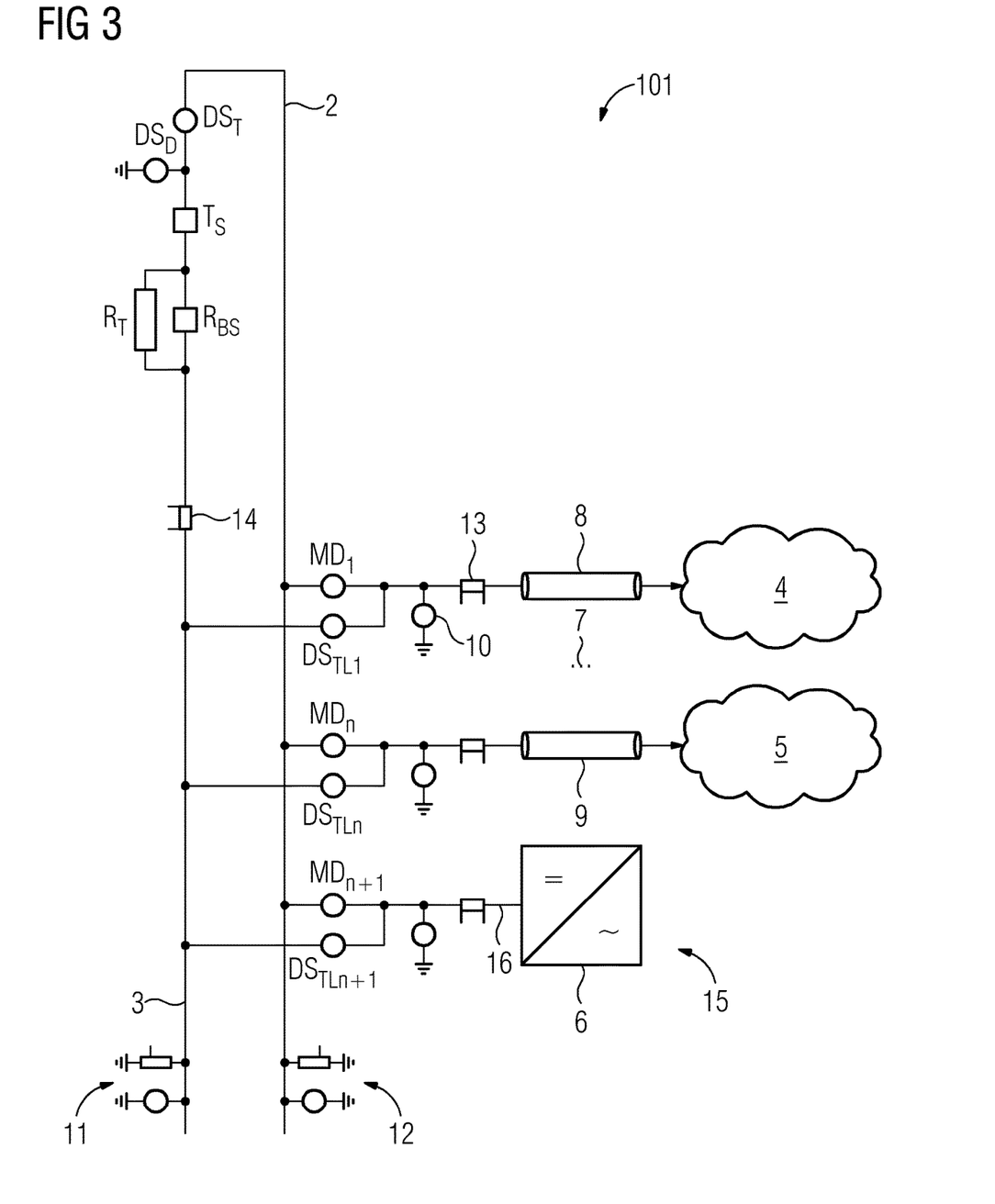

FIG. 3 shows an arrangement 101 for connecting or disconnecting a plurality of DC networks to each other (three DC networks, namely a first DC network 4, a second DC network 5 and are third DC network 15 are explicitly shown in the figure).

In contrast with the arrangement 1 of FIG. 1, the transfer bus 3 of the arrangement 101 does not have an additional inductance. This allows an even more compact design of the arrangement 101.

Figure 4:
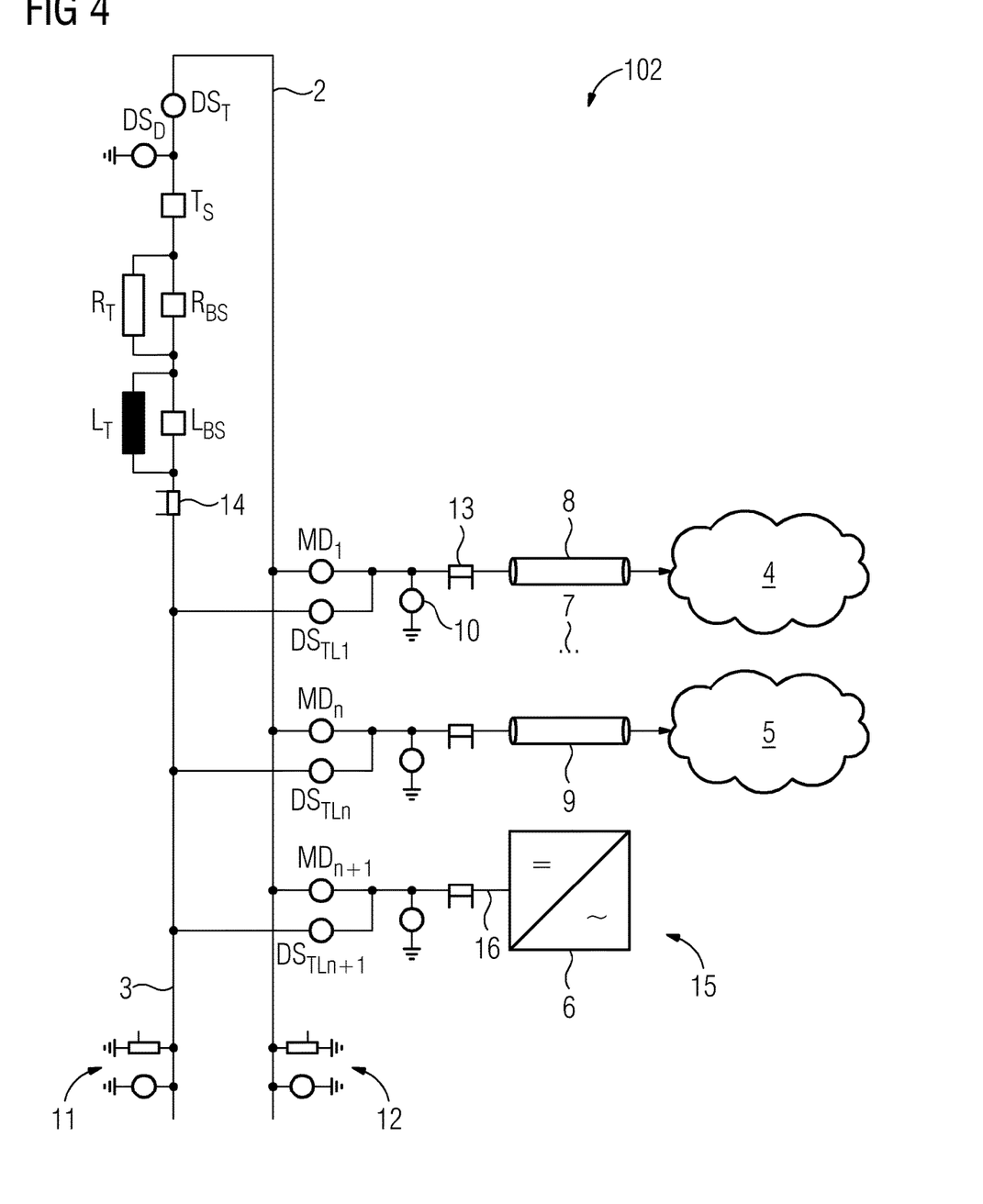

FIG. 4 shows an arrangement 102 for connecting or disconnecting a plurality of DC networks to each other (three DC networks, namely a first DC network 4, a second DC network 5 and are third DC network 15 are explicitly shown in FIG. 2).

In contrast with the arrangement 1 of FIG. 1, the transfer bus 3 of the arrangement 102 comprises an inductance $L_T$ and a inductance bypass switch LBS arranged in parallel to the inductance $L_T$. Bypassing the inductance $L_T$ can in certain situations reduce the stress on the main bus disconnectors.

With reference to FIG. 1, different examples of a method for connecting/disconnecting two DC sub-networks will be described below.

In a basic state of the arrangement 1, the transfer bus disconnector $DS_T$ is open (non-conducting). Also, all main switches (in this embodiment the main switches are given the first, second and third main disconnector) $DS_{TL1}$-$DS_{Tn+}1$ are open, so that all DC sub-networks are galvanically disconnected from the main bus 2. In its basic state, the arrangement 1 can be serviced independently of the status of the sub-networks 4, 5, 15. In particular, it can be serviced while the operating equipment in any of the sub-networks 4, 5, 15 is active/in operation.

Example 1: Connect Discharged Converter to Energized HVDC Grid with Peak Current Suppression The converter 6 is initially grounded via the corresponding grounding device on its DC side. The first DC sub-network 4 is connected with the main bus 2 via the first main disconnector $MD_1$. In a first step, the grounding device of the converter 6 is opened, the transfer bus disconnector $DS_T$ and the third transfer disconnector $DS_{TLn+1}$ is closed (switched on). In a second step, the transfer switched $T_S$ is closed, while the resistor bypass switch $R_{BS}$ is still open. The resistor $R_T$ bears the voltage difference between the main bus 2 and the DC side of the converter 6 and limits the current. If the converter is not yet or only partly charged (in case the converter is a modular multilevel converter with switching modules each comprising a separate energy storage, then the energy storages are being charged), then the resistor $R_T$ limits the charging currents in the transfer bus 3 and the converter 6. Subsequently, the resistor bypass switch $R_{BS}$ is closed to establish direct connection with the converter 6. The inductance $L_T$ limits transient compensating currents which may occur in the arrangement. Such compensating currents particularly occur in case of sudden changes at the switching equipment during switching operations. This might particularly occur in the case of sudden changes in the power flow or during fault events. Meanwhile, the converter 6 is further charged. The time duration between the closing of the transfer switch $T_S$ and the closing of the resistor bypass switch $R_{BS}$ basically defines the amount of energy provided for charging of the converter 6. By closing of the third main disconnector $MD_{n+1}$ the converter 6 is connected to the main bus 2, thus establishing a parallel connection between the first sub-network 4 and the converter 6. Subsequently, the transfer switch $T_S$, the bypass switch $R_{BS}$ and the transfer bus disconnector $DS_T$ as well as the third transfer disconnector $DS_{TLn+1}$ are re-opened. The arrangement returns to its basic state and is ready for the next connecting or disconnecting action.

Example 2: Connect Energized Converter to Energized HVDC Grid with Peak Current Suppression The initial configuration is similar to the one in example 1. However, in this example 2, the converter 6 is energized and in operation but at a different DC voltage level than the first sub-network 4. The first DC sub-network 4 is connected to the main bus via the first main disconnector $MD_1$. Whether the second sub-network 5 is connected to the main bus 2 or not is not relevant. In a first step, the transfer bus disconnector $DS_T$ and the third transfer disconnector $DS_{TLn+1}$ are both closed (switched on). The next step requires the voltage difference between the main bus 2 and the converter 6 to be as small as possible. The voltage at the main bus 2 is measured by the voltage sensing device 12 and the voltage at the transfer bus 3 is measured by the voltage sensing device 11 in order to level both voltages with the help of appropriate control of converter 6. In a second step, the transfer switched $T_S$ is closed, while the resistor bypass switch $R_{BS}$ is still open. The resistor $R_T$ then bears the remaining voltage difference between the main bus 2 and the DC side of the converter 6 and limits the corresponding current. The transfer bus current is measured by the current sensing device 14. The measured currents and voltages are transferred to the corresponding converter control to control the DC side converter voltage, particularly to adjust said DC side voltage to equal the voltage at the DC node (i.e., the main bus 2) with the goal of a zero current in the transfer bus 3.

Subsequently, the resistor bypass switch $R_{BS}$ is closed to establish direct connection with the converter 6. The inductance $L_T$ limits transient compensating currents which may occur in the arrangement. Such compensating currents particularly occur in case of sudden changes at the switching equipment during switching operations. This might particularly occur in the case of sudden changes in the power flow or during fault events. By the closing of the third main disconnector $MD_{n+1}$ the converter 6 is connected to the main bus 2 establishing a parallel connection between the first sub-network 4 and the converter 6. Subsequently, the transfer switch $T_S$, the bypass switch $R_{BS}$ and the transfer bus disconnector $DS_T$ as well as the third transfer disconnector $DS_{TLn+1}$ are opened again. The arrangement returns to its basic state and is ready for the next connecting or disconnecting action.

Example 3: Connect Discharged HVDC Line (Cable) to Energized HVDC Grid with Peak Current Suppression In the initial state the first main disconnector $MD_1$ is closed. The second DC line 9 is not grounded. In a first step the second transfer disconnector $DS_{TLn}$ and the transfer bus disconnector $DS_T$ are closed. In a second step the transfer switch $T_S$ is closed. In a third step the resistor bypass switch $R_{BS}$ is closed. In a fourth step the second main disconnector $MD_n$ is closed. Subsequently, the transfer switch $T_S$, the bypass switch $R_{BS}$ and the transfer bus disconnector $DS_T$ as well as the third transfer disconnector $DS_{TLn+1}$ are opened again. The arrangement returns to its basic state and is ready for the next connecting or disconnecting action.

Example 4: Connect Energized HVDC Line (Cable) to Energized HVDC Grid with Peak Current Suppression In the initial state the first main disconnector $MD_1$ is closed. The second DC line 9 is energized but at a different voltage level than the main bus voltage. In a first step the second transfer disconnector $DS_{TLn}$ and the transfer bus disconnector $DS_T$ are closed. For the next step it is advantageous to have the voltage difference between the main bus 2 and the DC line 9 as small as possible. The voltage at the main bus 2 is measured by the voltage sensing device 12 and the voltage at the transfer bus 3 is measured by the voltage sensing device 11 to level both voltages with the help of appropriate control of converter 6. In a second step the transfer switch $T_S$ is closed. The remaining voltage difference between the two DC networks 4 and 5 is now present at the resistor $R_T$. The transfer bus current is measured by the current sensing device 14. The measured currents and voltages are transferred to the corresponding converter control to control the DC main bus voltage, particularly to adjust said DC line voltage to equal the voltage at the DC node (i.e., the main bus 2) to achieve zero current in the transfer bus 3. After the voltages of the networks are sufficiently synchronized, i.e., the transfer bus current is zero or close to zero, in a third step the resistor bypass switch $R_{BS}$ is closed. In a fourth step the second main disconnector $MD_n$ is closed. Subsequently, the transfer switch $T_S$, the bypass switch $R_{BS}$ and the transfer bus disconnector $DS_T$ as well as the second transfer disconnector $DS_{TLn}$ are opened again. The arrangement returns to its basic state and is ready for the next connecting or disconnecting action.

Example 5: Disconnect Converter from Energized HVDC Grid

In an initial state the first and third main disconnector $MD_1$, $MD_{n+1}$ are both closed. The converter 6 and the DC grid 4 are both energized and in operation. First, the transfer bus disconnector $DS_T$, the transfer switch $T_S$, the resistor bypass switch $R_{BS}$ and the third transfer disconnector $DS_{TLn+1}$ are closed to establish a parallel connection between the converter 6 and the DC grid 4. Then, by opening the third main disconnector $MD_{n+1}$ the current is commutated to the transfer bus 3. The converter current is controlled to a value close to zero (ideally equal to zero). Then, the current is commutated to the resistor $R_T$ by opening the resistor bypass switch $R_{BS}$ to further limit the current. Immediately after opening the bypass switch, the transfer switch $T_S$ is opened. The converter 6 is thus disconnected from the first sub-network 4. The arrangement returns to its basic state by opening the transfer bus disconnector $DS_T$ and the third transfer disconnector $DS_{TLn+1}$.

Example 6: Disconnect Charged HVDC Line from Energized DC Grid

In an initial state the first and second main disconnector $MD_1$, $MD_n$ are both closed. The DC grids (sub-networks) 4 and 5 are both energized and in operation. First, the transfer bus disconnector $DS_T$, the transfer switch $T_S$, the resistor bypass switch $R_{BS}$ and the second transfer disconnector $DS_{TLn}$ are closed to establish a parallel connection between the first and second DC grid 4 and 5. Then, by opening the second main disconnector $MD_n$ the current is commutated to the transfer bus 3. The current in the arrangement 1 is controlled to a value close to zero (ideally equal to zero). Then, the current is commutated to the resistor $R_T$ by opening the resistor bypass switch $R_{BS}$ to further limit the current. Immediately after opening the bypass switch, the transfer switch $T_S$ is opened. The second DC sub-network 5 is now cut off the first sub-network 4. The arrangement returns to its basic state by opening the transfer bus disconnector $DS_T$ and the second transfer disconnector $DS_{TLn}$.

Example 7: Discharge and Ground HVDC Line (HVDC Cable) with Peak Current Suppression The arrangement 1 can further be applied for discharging a partially charged second DC line 9. Initially, the main disconnector $MD_n$ is open. Also, the transfer bus disconnector $DS_T$ and the resistor bypass switch $R_{BS}$ are open. To prepare the discharging, the discharge switch $DS_D$ is closed. The second DC line 9 is connected to the arrangement 1 by closing the second transfer disconnector $DS_{TLn}$. In a following step the transfer switch $T_S$ is closed to start the discharging of the second DC line 9. As soon as the discharge current decreases below a predefined threshold, the resistor bypass switch $R_{BS}$ is closed. The inductance $L_T$ limits the current change rate. Afterwards, the DC line 9 can be grounded by its own grounding device or devices. Finally, the second transfer disconnector $DS_{TLn}$ and the transfer bus disconnector $DS_T$ are reopened and the arrangement 1 returns to its basic state.

Various acronyms appear in the above description, including: DC=direct current, d.c.; AC=alternating current, a.c.; PV=photovoltaic; HV=high voltage; HVDC=high voltage, direct current. The terms grid and network are used interchangeably.

The invention claimed is:
1. An arrangement for selectively connecting and disconnecting a plurality of DC networks to one another, the arrangement comprising:
   a main bus for connecting a plurality of DC lines with each other;
   a first DC line for connection to a first DC network having DC operating equipment, and a first main switch connecting said first DC line to said main bus;

a second DC line for connection to a second DC network having DC operating equipment, and a second main switch connecting said second DC line to said main bus;

a transfer bus electrically connected to said main bus, said transfer bus including:
 a transfer bus disconnector for disconnecting said main bus from said transfer bus;
 a transfer switch;
 a current limiting device having a resistor and a parallel resistor bypass switch for bypassing said resistor;
a first transfer disconnector connected between said first DC line and said transfer bus; and
a second transfer disconnector connected between said second DC line and said transfer bus.

2. The arrangement according to claim 1, wherein said current limiting device further comprises an inductance.

3. The arrangement according to claim 2, wherein said current limiting device further comprises a parallel inductance bypass switch for bypassing said inductance.

4. The arrangement according to claim 1, further comprising a discharge switch connected between said transfer bus and ground potential.

5. The arrangement according to claim 1, wherein said transfer bus further comprises at least one of a current sensing device or a voltage sensing device.

6. The arrangement according to claim 1, wherein said transfer switch is a mechanical switch.

7. The arrangement according to claim 1, wherein said resistor is an actively cooled resistor.

8. The arrangement according to claim 7, wherein said resistor is a resistor cooled by a cooling fluid.

9. The arrangement according to claim 1, wherein said transfer bus further comprises a converter for actively damping voltage fluctuations.

10. A method for connecting a first DC sub-network to a second DC sub-network, the method comprising:
 providing an arrangement according to claim 1 with the first main switch closed;
 closing the second transfer disconnector and the transfer bus disconnector;
 closing the transfer switch;
 closing the resistor bypass switch;
 closing the second main switch;
 opening the transfer switch;
 opening the second transfer disconnector;
 opening the resistor bypass switch; and
 opening the transfer bus disconnector.

11. The method according to claim 10, wherein at least one of the first DC sub-network or the second DC sub-network comprises actively controllable operating equipment and a first DC line current is controlled to a level below 100 A or to a level below 50 A or to zero.

12. The method according to claim 11, wherein the actively controllable operating equipment is a converter.

13. A method for disconnecting a second DC sub-network from a first DC sub-network, the method comprising:
 providing an arrangement according to claim 1 with the first main switch and the second main switch closed;
 closing the second transfer disconnector;
 closing the transfer bus disconnector;
 closing the transfer switch;
 closing the resistor bypass switch;
 commutating the current to the transfer bus by opening the second main switch;
 opening the resistor bypass switch;
 opening the transfer switch; and
 opening the transfer bus disconnector and the second transfer disconnector.

14. The method according to claim 10, wherein at least one of the first DC sub-network or the second DC sub-network comprises actively controllable operating equipment and a first DC line current is controlled to a level below 100 A or to a level below 50 A or to zero.

15. The method according to claim 11, wherein the actively controllable operating equipment is a converter.

16. A method for discharging a DC line of a DC sub-network, the method comprising:
 providing an arrangement according to claim 1 with the first main switch closed;
 closing the first transfer disconnector;
 closing the discharge switch;
 closing the transfer switch;
 closing the resistor bypass switch; and
 opening the transfer bus disconnector and the first transfer disconnector.

17. The method according to claim 10, wherein at least one of the first DC sub-network or the second DC sub-network comprises actively controllable operating equipment and a first DC line current is controlled to a level below 100 A or to a level below 50 A or to zero.

18. The method according to claim 11, wherein the actively controllable operating equipment is a converter.

* * * * *